United States Patent
Yang et al.

(10) Patent No.: US 7,688,896 B2
(45) Date of Patent: Mar. 30, 2010

(54) METHOD AND APPARATUS FOR DECODING COMPRESSED VIDEO IMAGE DATA

(75) Inventors: Ying-Chih Yang, Hsinchu (TW); Han-Liang Chou, Hsinchu (TW); Jen-Yi Liao, Hsinchu (TW)

(73) Assignee: Sunplus Technology Co., Ltd, Hsinchu (TW)

( * ) Notice: Subject to any disclaimer, the term of this patent is extended or adjusted under 35 U.S.C. 154(b) by 1460 days.

(21) Appl. No.: 11/045,097

(22) Filed: Jan. 31, 2005

(65) Prior Publication Data

US 2006/0171470 A1    Aug. 3, 2006

(51) Int. Cl.
H04N 7/12 (2006.01)
H04N 7/137 (2006.01)

(52) U.S. Cl. ................... 375/240.25; 348/412

(58) Field of Classification Search ........... 348/390, 348/409, 411, 412, 413, 414, 415, 416, 417, 348/418, 423, 473, 474; 382/233, 232; 375/240.25, 375/240.24, 240.15, 240.27

See application file for complete search history.

(56) References Cited

U.S. PATENT DOCUMENTS 5,818,533 A * 10/1998 Auld et al. ............. 375/240.14
5,838,380 A * 11/1998 Sun et al. ............... 375/240.14
6,081,298 A   6/2000 Artieri
7,068,847 B1 * 6/2006 Chen ......................... 382/233

FOREIGN PATENT DOCUMENTS

CN   1138415 C   2/2004
TW   475331       2/2002

OTHER PUBLICATIONS

English language Derwent Abstract of CN 1138415C, Feb. 11, 2004.
English language Derwent Abstract of TW 475331, Feb. 1, 2002.

* cited by examiner

Primary Examiner—Behrooz Senfi
(74) Attorney, Agent, or Firm—Finnegan, Henderson, Farabow, Garrett, Dunner, LLP (57) ABSTRACT

A method and an apparatus for decoding video image data including a plurality of frames are provided. Each of the frames includes a reserved portion and a non-reserved portion. The method comprises decoding only the non-reserved portion of one of the frames and displaying the decoded non-reserved portion of the frame and the reserved portion of a previously decoded frame. The apparatus comprises a decoding device to decode the non-reserved portion of one of the frames and a displaying device to display the reserved portion of a previously decoded frame and the decoded non-reserved portion of the frame.

17 Claims, 12 Drawing Sheets

| | | | | | | | |
|---|---|---|---|---|---|---|---|
| MB (0,0) | MB (0,1) | ... | MB (0,43) | MB (0,44) | | | |
| MB (1,0) | MB (1,1) | ... | MB (1,43) | MB (0,44) | | | |
| MB (2,0) | MB (2,1) | ... | MB (2,43) | MB (2,44) | | | |
| ... | ... | ... | ... | ... | | | |
| MB (28,0) | MB (28,1) | ... | MB (28,43) | MB (28,44) | | | |
| MB (29,0) | MB (29,1) | ... | MB (29,43) | MB (29,44) | | | |
| MBL 0 | MBL 1 | MBL 2 | ... | MBL 28 | MBL 29 | | |

FRAME

METHOD AND APPARATUS FOR DECODING COMPRESSED VIDEO IMAGE DATA

FIELD OF THE INVENTION

The present invention generally relates to a method and an apparatus for decoding video image data and, more particularly, to a method and an apparatus for decoding compressed MPEG video image data.

BACKGROUND OF THE INVENTION

The Motion Pictures Expert Group (MPEG) standard authorized by the International Organization for Standardization (ISO) and International Telecommunication Organization (ITO) is widely used for processing digital video image data. Base on the MPEG standard, video image data can be compressed to be a sequence of frames of three different types, i.e. Intra (I) frames, Predictive (P) frames, and Bi-directionally Predictive (B) frames. The I-frames are independently coded and are the least efficiently coded of the three frame types. The P-frames are coded relative to the previously coded I- or P-frame such that only the differences between the P-frame and the previously coded I- or P-frame are stored. The B-frames are coded relative to both the previous and the next I- or P-frames so that only the differences between the B-frame and the previous and next I- or P-frames are captured, compressed, and stored. In this manner, the data amounts required to represent digital video images are reduced.

When decoding the compressed video images, the I-frames can be decoded independently. However, the P-frames must be decoded based on the previously decoded I- or P-frame and the B-frames must be decoded based on the previously and the next decoded I- or P-frames. Because of the frame dependencies, the order in which the frames are decoded or stored is not necessarily the same as the order in which the frames are displayed. For example, the frame sequence in display order can be:

$I_1 B_1 B_2 P_1 B_3 B_4 P_2 B_5 B_6 P_3 B_7 B_8 I_2 B_9 B_{10} P_4 B_{11} B_{12} P_5 B_{13} B_{14} P_6$

However, the frame sequence in decoded/stored order is different from the display order, and can be:

$I_1 P_1 B_1 B_2 P_2 B_3 B_4 P_3 B_5 B_6 I_2 B_7 B_8 P_4 B_9 B_{10} P_5 B_{11} B_{12} P_6 B_{13} B_{14}$

It is also because of the frame dependencies that a memory device, i.e., frame buffer, is needed to store the decoded I-frames, P-frames, and B-frames when decoding the video image data that is compressed based on the MPEG standard. With the reference to the exemplary frame sequence in decoded/stored order shown above, the I-frame and the P-frame, such as $I_1$ and $P_1$, must be decoded first and then the two B-frames corresponding to the previously decoded I- and P-frame, such as $B_1$ and $B_2$, are decoded so that the B-frames can be decoded with the reference of the previously decoded I-frame and P-frame. The decoded I-frames, P-frames, and B-frames are stored in specific locations of the frame buffer. The capacity of the frame buffer is a major cost in the production of a video decoder. Thus, it is desired to reduce the required capacity of the frame buffer in order to reduce its cost.

The video image data can be in either a progressive or an interlaced format. The progressive format is a frame-based data structure and the interlaced format is a field-based data structure. Each frame in an interlaced format can be divided into two fields, referred to as top and bottom fields. The top field contains every other line in the frame beginning with the first line. The bottom field contains every other line beginning with the second line. In other words, the top field comprises the odd lines and the bottom field comprises the even lines. The interlaced video image data is processed and displayed in a field-based manner.

Most video image data formats are compatible with either the NTSC (National Television Standard Committee) or the PAL (Phase Alternating Line) standard. The NTSC format is 720×480 pixels per frame and the PAL format is 720×576 pixels per frame. The frame rate is 30 frames per second under the NTSC standard and 25 frames per second under the PAL standard.

There is thus a general need in the art for method and apparatus for decoding compressed video image data, which at least include a frame buffer with reduced size so that the cost can be reduced.

SUMMARY OF THE INVENTION

Accordingly, the present invention is directed to method and apparatus for decoding compressed video image data that obviate one or more of the problems due to limitations and disadvantages of the related art.

In accordance with the present invention, there is provided a method for decoding video image data including a plurality of frames. Each of the frames includes a reserved portion and a non-reserved portion. The method comprises decoding only the non-reserved portion of one of the frames and displaying the decoded non-reserved portion of the frame and the reserved portion of a previously decoded frame.

Also, in accordance with the present invention, there is provided an apparatus for decoding video image data including a plurality of frames. Each of the frames includes a reserved portion and a non-reserved portion. The apparatus comprises a decoding device to decode the non-reserved portion of one of the frames and a displaying device to display the reserved portion of a previously decoded frame and the decoded non-reserved portion of the frame.

Also, in accordance with the present invention, there is provided a method for decoding video image data including at least a frame comprising a first sub-frame and a second sub-frame and the frame being divided into a reserved portion and a non-reserved portion. The method comprises decoding the reserved portion of the frame including a portion of the first sub-frame and a portion of the second sub-frame, decoding the non-reserved portion of the fist sub-frame, displaying the first sub-frame, decoding the non-reserved portion of the second sub-frame, and displaying the second sub-frame.

Also, in accordance with the present invention, there is provided a method for decoding video image data including at least a frame comprising at least one sub-frame and the frame being divided into a reserved portion and a non-reserved portion. The method comprises decoding the reserved portion of the frame including a portion of each sub-frame, decoding the non-reserved portion of the sub-frame, and displaying the sub-frame according to the non-reserved portion and the reserved portion of the sub-frame.

Also, in accordance with the present invention, there is provided an apparatus for decoding video image data including at least a frame comprising at least one sub-frame and the frame being divided into a reserved portion and a non-reserved portion. The apparatus comprises a decoding device to decode the reserved portion of the frame including a portion of each sub-frame and the non-reserved portion of the sub-frame and a display device to display the sub-frame according to the non-reserved portion and the reserved portion of the sub-frame for decoding video image data including at least one frame.

Additional features and advantages of the invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and, together with the description, serve to explain the principles of the invention.

DESCRIPTION OF THE EMBODIMENTS

Reference will now be made in detail to embodiments of the invention, which are illustrated in the accompanying drawings. Wherever possible, the same reference numbers will be used throughout the drawings to refer to the same or like parts.

Figure 1:
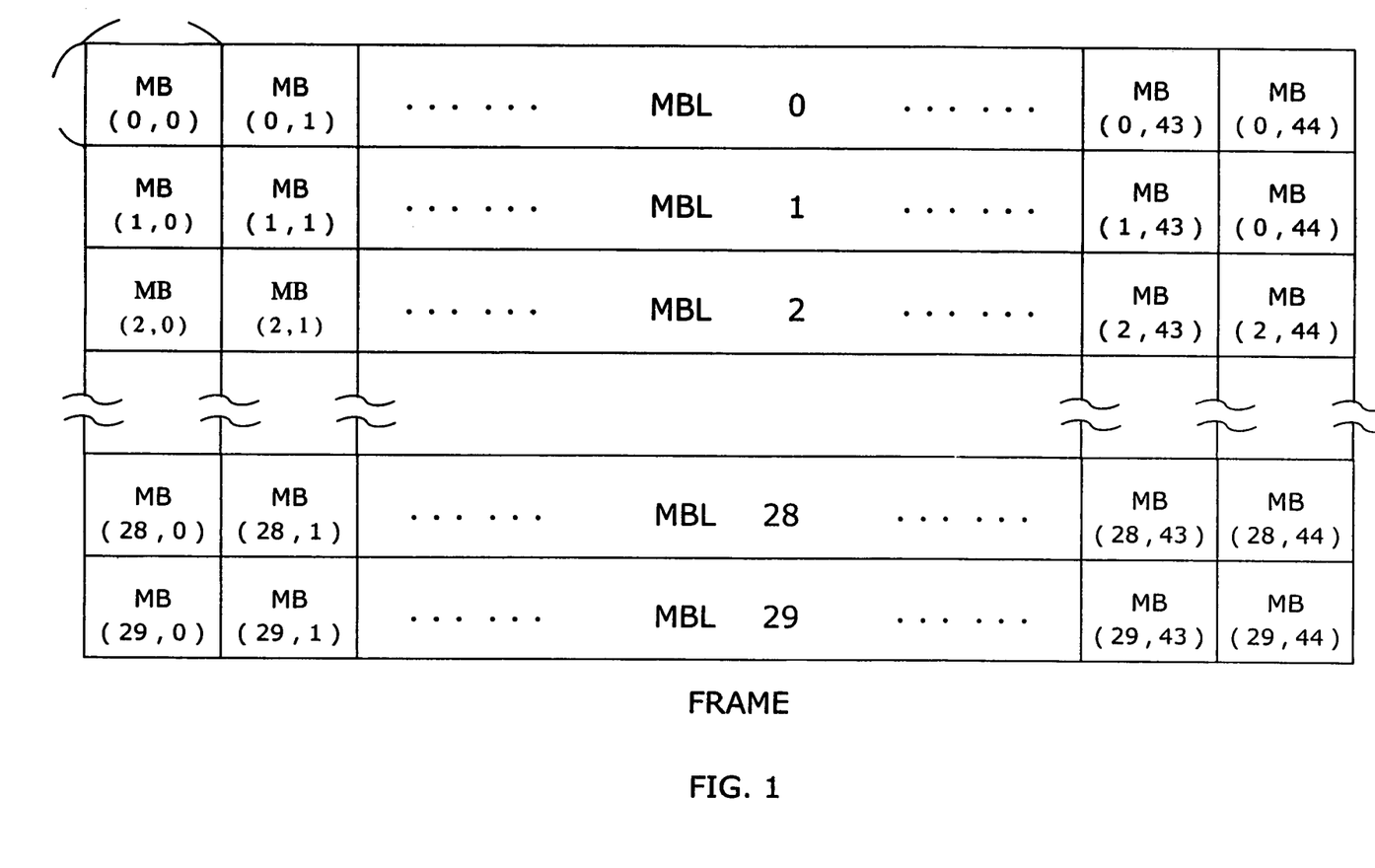
FIG. 1 is a diagram illustrating a frame, compatible with the NTSC standard, which is divided into a plurality of macroblock lines (MBLs)

FIG. 1 is a diagram illustrating a frame, compatible with the NTSC standard, which is divided into a plurality of macroblock lines (MBLs). According to the MPEG standard, each frame is divided into a grid of 16×16 pixel squares called macroblocks (MBs) to perform motion estimation/compensation when compressing/decoding video image data. Since the resolution of a frame compatible with the NTSC standard is 720×480 pixels, the frame can be divided into 30×45 MBs and every 45 MBs in the same horizontal line are called a macroblock line (MBL). There are 30 MBLs in a frame and they are identified as MBL 0~29 in FIG. 1. The individual macroblocks in a macroblock line are identified by the horizontal line number and the macroblock's position within the macroblock line. For example, as shown in FIG. 1, the $43^{rd}$ macroblock in the second macroblock line is identified as MB(2,43).

FIGS. 2, 3, 4, 5, and 6 are diagrams respectively illustrating steps of a method for decoding video image data according to the first embodiment of the present invention. The video image data decoding method of the first embodiment is for use in an MPEG video decoder which decodes and displays in a progressive manner. When decoding frames, all MBs are decoded in an order from the first MB of the first MBL, i.e., MB (0,0), to the last MB of the last MBL, i.e., MB(29,44). In order to be displayed at a desired frame rate, the decoded MBLs must be displayed immediately after being decoded and stored. Since the decoded MBL is no longer required after it is displayed, the location in a frame buffer for storing the previously decoded MBL can be used to store another decoded MBL after the previously decoded MBL is displayed. As a result, the required capacity of the frame buffer can be reduced. In this embodiment, the MBLs are divided into reserved MBLs and non-reserved MBLs. The macroblocks are stored in a frame buffer 200 that includes a reserved part 202 and a non-reserved part 204. More particular, frame buffer 200 is divided into reserved part 202 for storing the reserved MBLs and non-reserved part 204 for storing the non-reserved MBLs. The reserved MBLs are stored in reserved part 202 of frame buffer 200 after being decoded. Thus, the reserved MBLs are stored in frame buffer 200 even after being displayed. The non-reserved MBLs are stored in non-reserved part 204 of frame buffer 200 after being decoded but are not retained in frame buffer 200 after being displayed. Each non-reserved MBL stored in frame buffer 200 can be replaced after it is displayed by another non-reserved MBL.

The number of reserved MBLs in a frame is determined based on the capacity of frame buffer 200. The number of reserved MBLs in a frame can be large if the capacity of frame buffer 200 is large. If the capacity of frame buffer 200 is small, the number of reserved MBLs in a frame is preferably small. In this embodiment, the first three MBLs (MBL 0~MBL 2) of the frame are set to be the reserved MBLs and the other MBLs are set to be the non-reserved MBLs.

Figure 2:
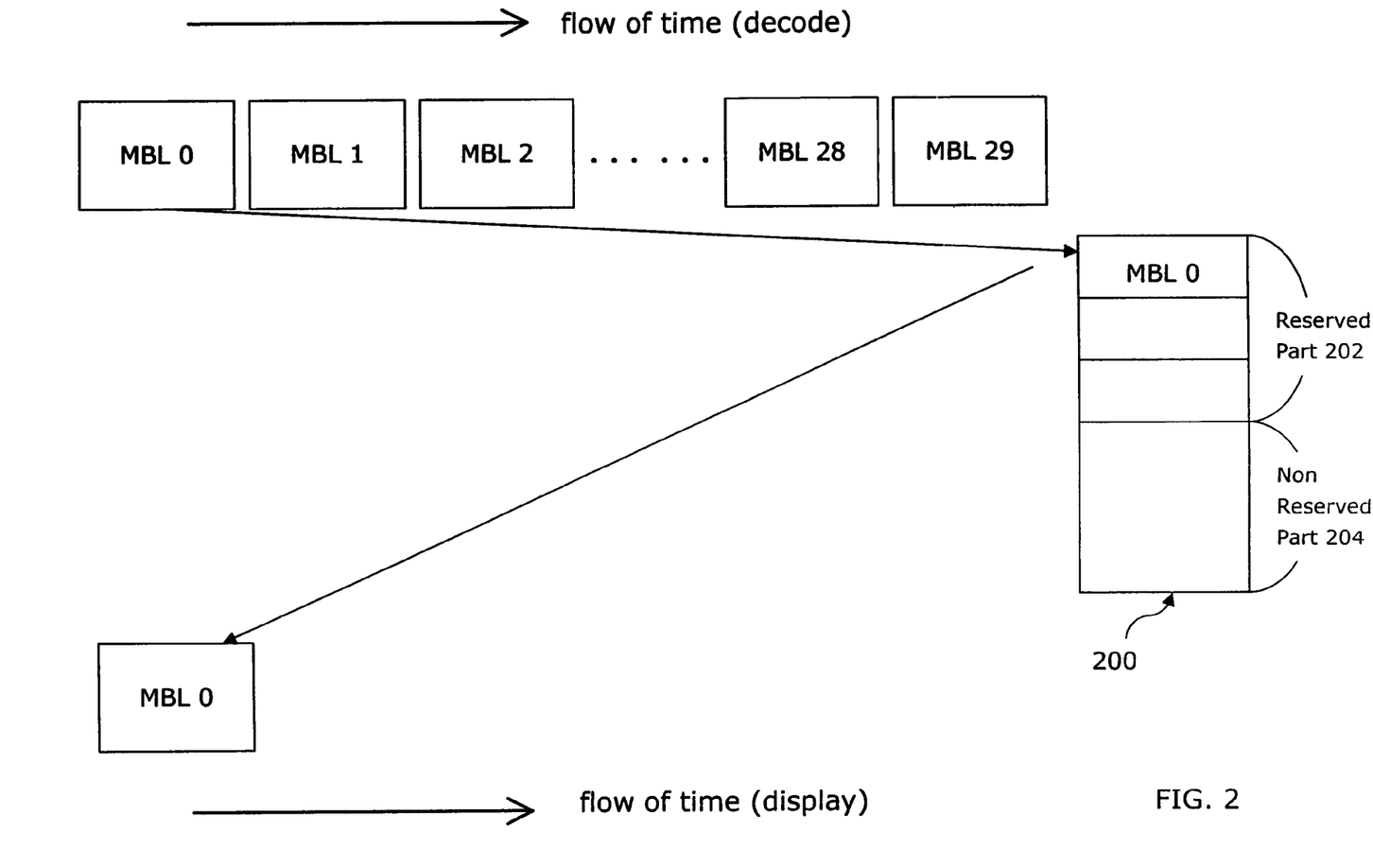
FIGS. 2, 3, 4, 5, and 6 are diagrams respectively illustrating steps of a method for decoding video image data according to a first embodiment of the present invention.

With reference to FIG. 2, when decoding the first B-frame which requires reference to a previously decoded I-frame or P-frame, the first MBL (MBL 0) is stored in reserved part 202 of frame buffer 200 after being decoded and is displayed immediately after being decoded and stored.

Figure 3:
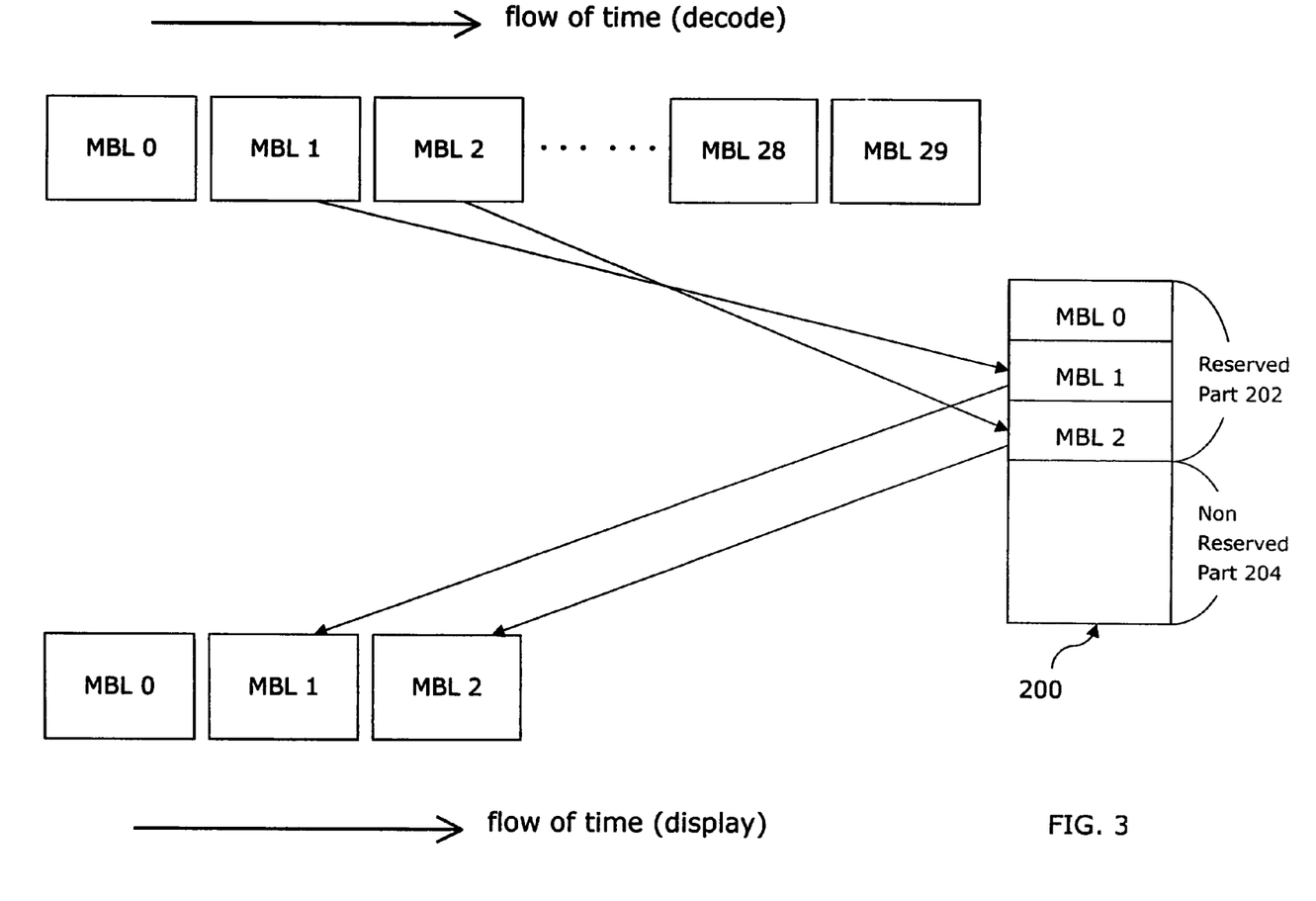
Figure 4:
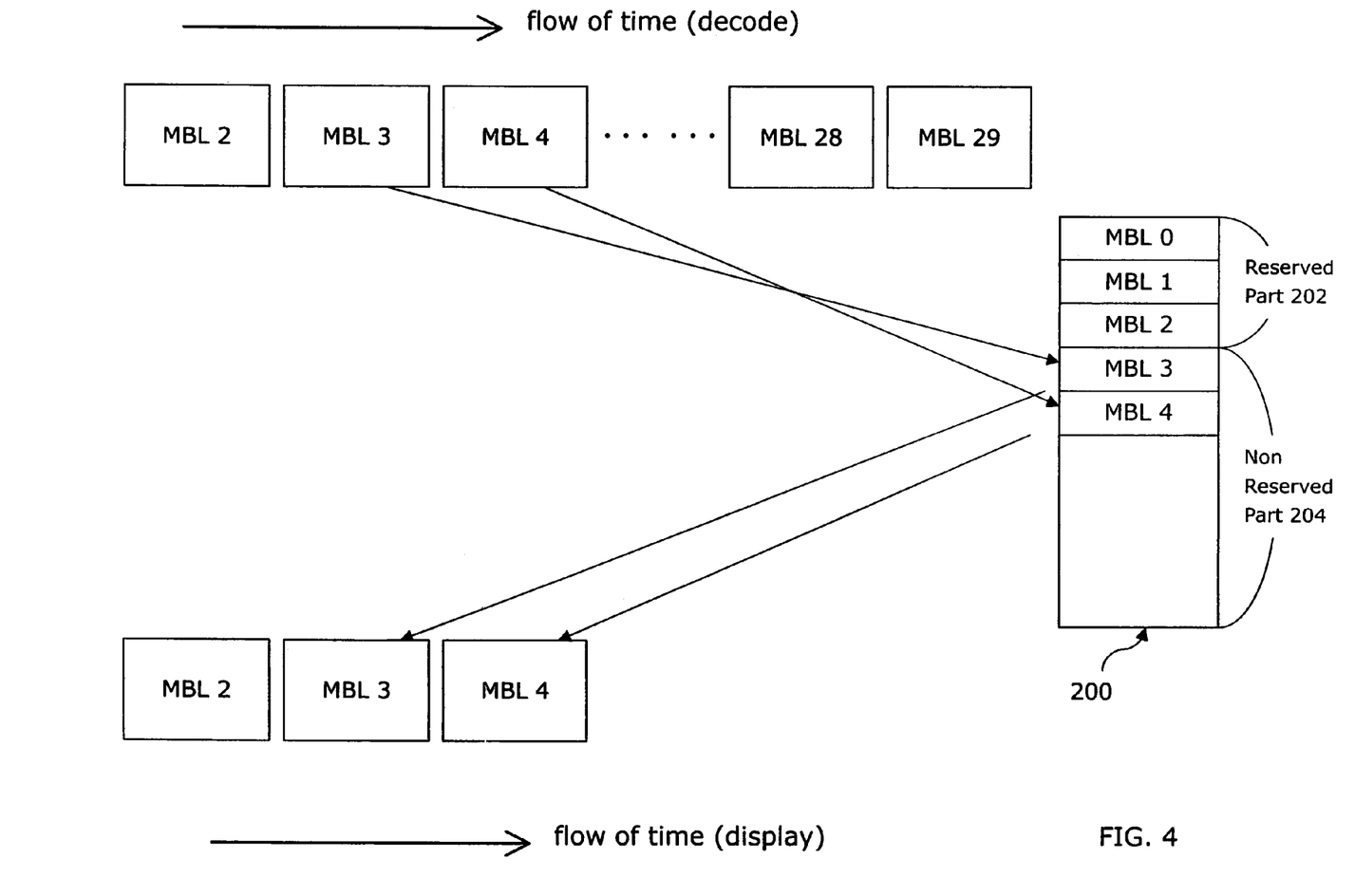
Figure 5:
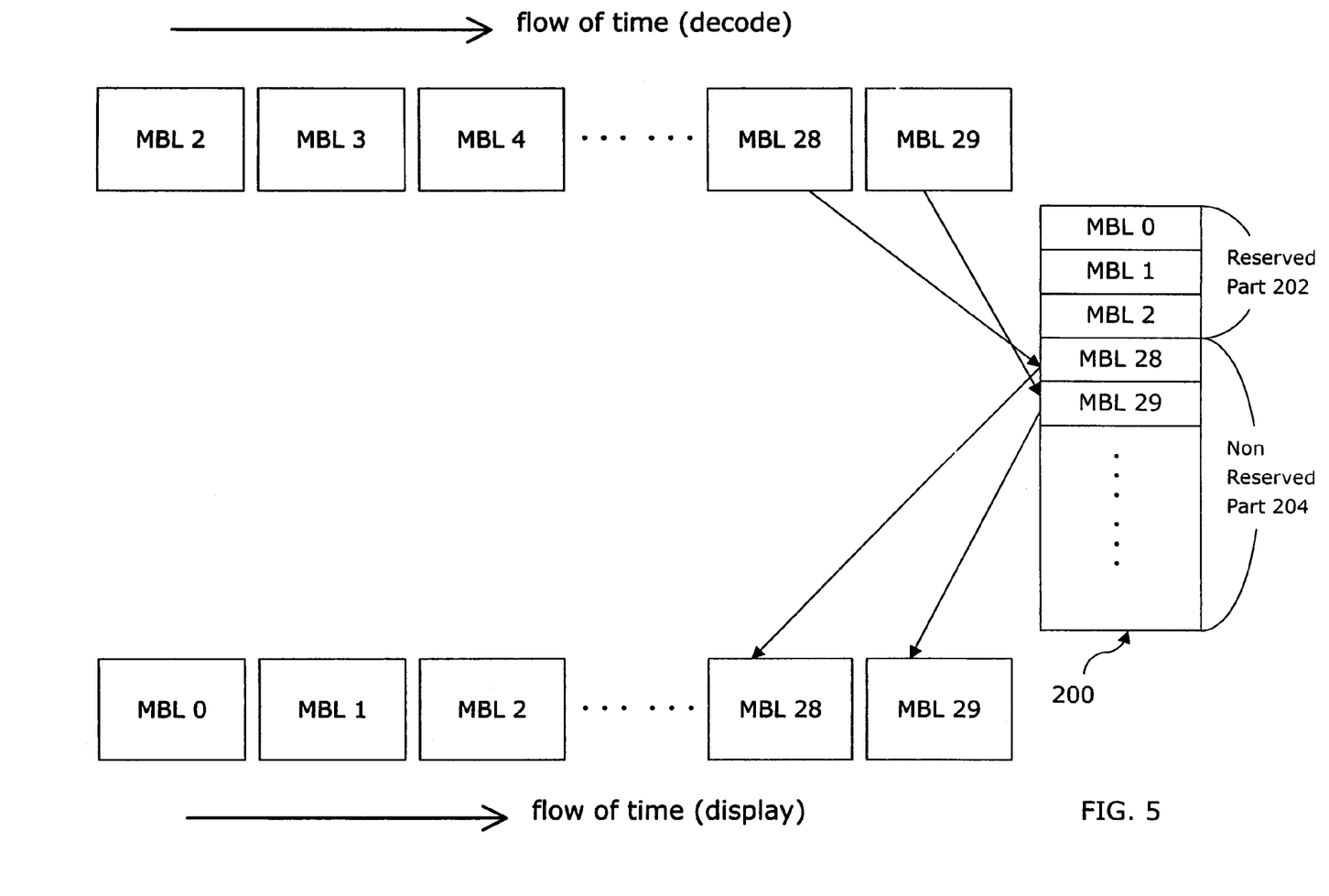

With reference to FIG. 3, the second and the third MBLs (MBL 1 and MBL 2) are decoded, stored in reserved part 202, and displayed in the same manner as MBL 0. Next, referring to FIG. 4, the following MBLs (MBL 3, MBL 4, . . . , MBL 29) are stored into non-reserved part 204 of frame buffer 200 after being decoded and are displayed immediately after being decoded and stored. The previously decoded non-reserved MBLs stored in non-reserved part 204 of frame buffer 200 will be replaced by later decoded non-reserved MBLs due to limited memory capacity. For example, as shown in FIG. 5, previously decoded MBL 3 and MBL 4 stored in non-reserved part 204 of frame buffer 200, as shown in FIG. 4, are replaced by later decoded MBL 28 and MBL 29, respectively. The decoded reserved MBLs (MBL 0~MBL 2) are kept in reserved part 202 of frame buffer 200 even after all MBLs of the first B-frame are displayed.

Figure 6:
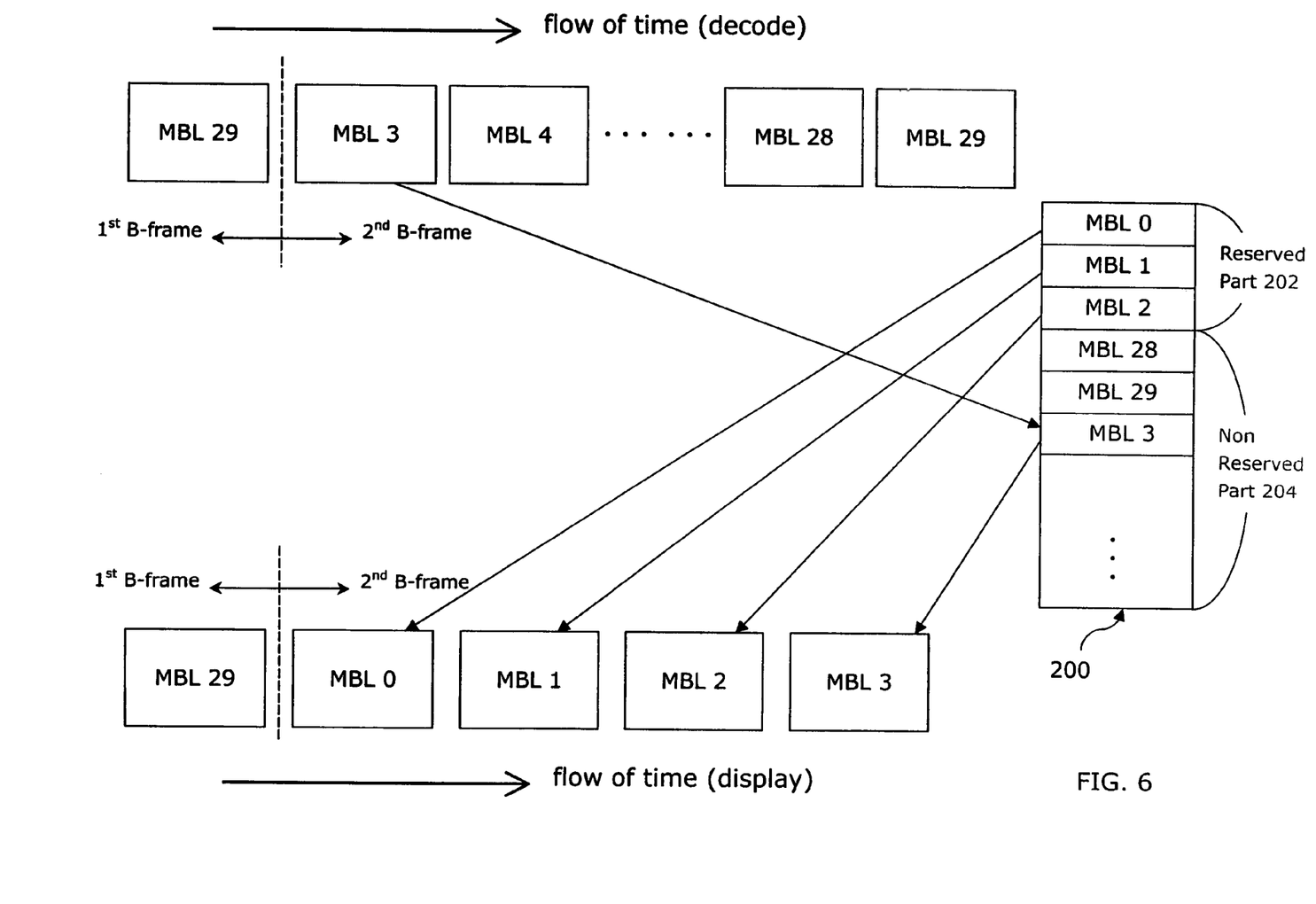

The video decoder must decode the second B-frame immediately after decoding the first B-frame in order to display decoded MPEG frames at the desired frame rate. With reference to FIG. 6, when decoding the second B-frame, the first three MBLs of the first B-frame stored in reserved part 202 of frame buffer 200 are retrieved from frame buffer 200 and displayed as the first three MBLs of the second B-frame, so that the first three MBLs of the second B-frame need not be decoded or stored. The video decoder decodes MBL 3~MBL 29 (non-reserved MBLs) of the second B-frame immediately after decoding the last MBL of the first B-frame. The time and effort to decode and store the reserved MBLs of the second B-frame can thus be saved.

FIGS. 7, 8, 9, and 10 are diagrams respectively illustrating steps of a method for decoding video image data according to the second embodiment of the present invention. The method illustrated in FIGS. 7~10 is practiced using frame buffer 700 that includes a reserved part 702 and a non-reserved part 704. The video image data of the second embodiment is an interlaced video image data. Each frame in an interlaced format can be divided into a top field containing all odd lines and a bottom field containing all even lines of the frame. Each frame of the interlaced video image data is displayed in a field-based order. For example, when displaying each frame of the interlaced video image data, the bottom field of the frame is displayed first and then the top field of the frame is displayed. However, the present invention is not so limited. The top field of the frame can be displayed first and then the bottom field of the frame is displayed when displaying each frame of the interlaced video image data in the field-based order.

In the second embodiment, each macroblock (MB) can be divided into a top sub-MB that belongs to the top field and a bottom sub-MB that belongs to the bottom field. In this manner, each macroblock line (MBL) can be divided into a top sub-MBL that contains top sub-MBs and a bottom sub-MBL that contains bottom sub-MBs in the same macroblock line. The decoded sub-MBL is displayed immediately after being decoded and stored in frame buffer 700. The previously decoded sub-MBL stored in frame buffer 700 can be replaced by another decoded sub-MBL after the previously decoded sub-MBL is displayed. The required size of frame buffer 700 can thus be reduced.

Also in the second embodiment, all sub-MBLs of a frame can be divided into reserved sub-MBLs and non-reserved sub-MBLs. The reserved sub-MBLs are stored in retained part 702 of frame buffer 700 after being decoded and are reserved in reserved part 702 even after being displayed. The non-reserved sub-MBLs are stored in non-reserved part 704 of frame buffer 700 after being decoded but need not be retained in frame buffer 700 after being displayed. Non-reserved part 704 of frame buffer 700 for storing the non-reserved sub-MBLs can be used to store other non-reserved sub-MBLs when necessary. The top sub-MBLs of the first three MBLs (MBL 0~MBL 2) are set to be the reserved sub-MBLs of this embodiment and the other sub-MBLs are set to be the non-reserved sub-MBLs of this embodiment.

The number of reserved sub-MBLs in a frame is determined based on the capacity of frame buffer 700. The number of reserved sub-MBLs in a frame can be large if the capacity of frame buffer 700 is large. If the capacity of frame buffer 700 is small, the number of reserved sub-MBLs in a frame is preferably small. Furthermore, it is not only top sub-MBLs but bottom sub-MBLs that can be predetermined to be reserved sub-MBLs.

Figure 7:
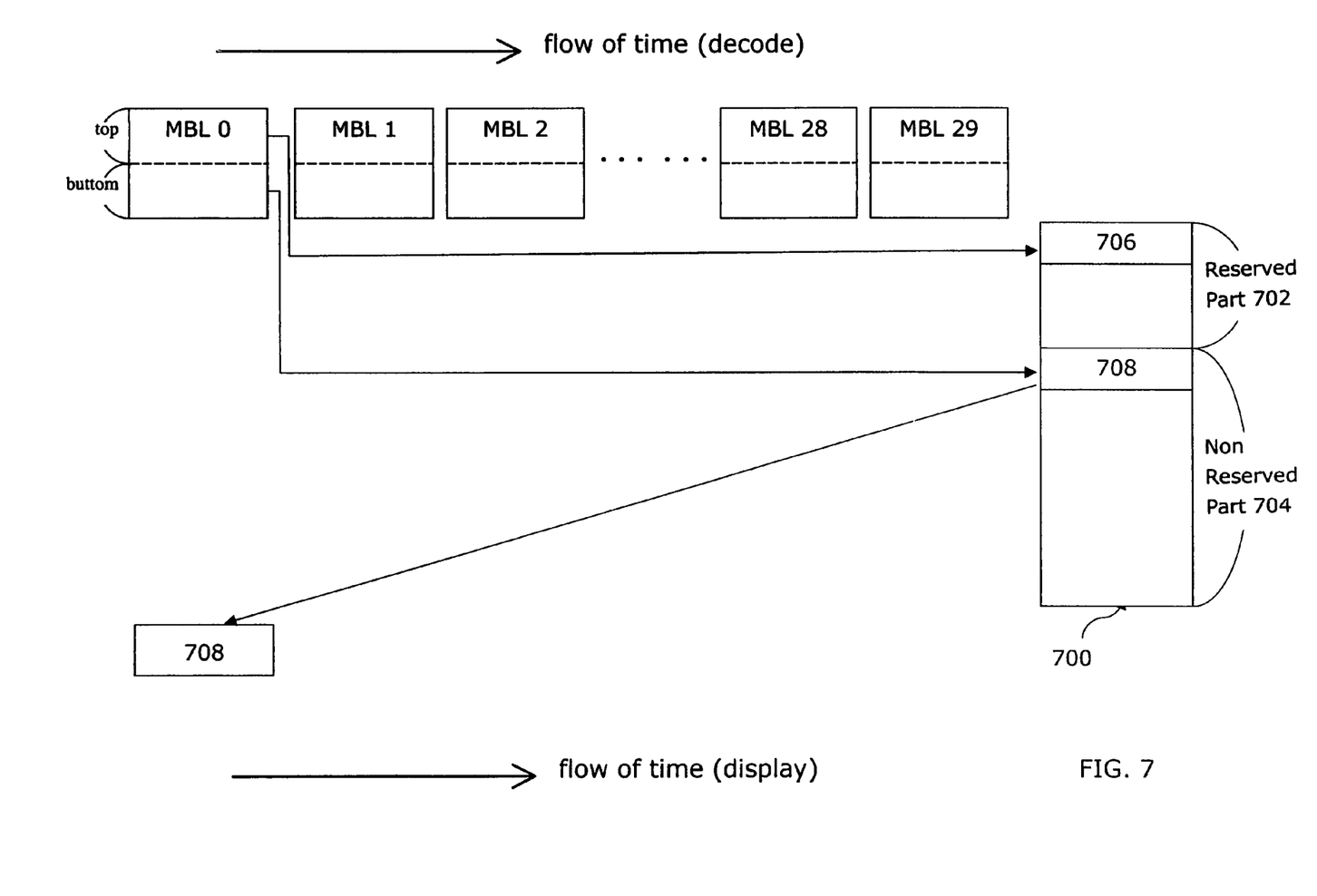
FIGS. 7, 8, 9, and 10 are diagrams respectively illustrating steps of a method for decoding video image data according to a second embodiment of the present invention.

With reference to FIG. 7, a top sub-MBL 706 of the first MBL (MBL 0) is stored in reserved part 702 of frame buffer 700 after being decoded and a bottom sub-MBL 708 of MBL 0 is decoded immediately after top sub-MBL 706 is decoded and is stored in non-reserved part 704 of frame buffer 700 after being decoded. Since the bottom field of the first B-frame is displayed first, only decoded bottom sub-MBL 708 is displayed while decoded top sub-MBL 706 is stored in reserved part 702 of frame buffer 700 without being displayed, as also shown in FIG. 7.

Figure 8:
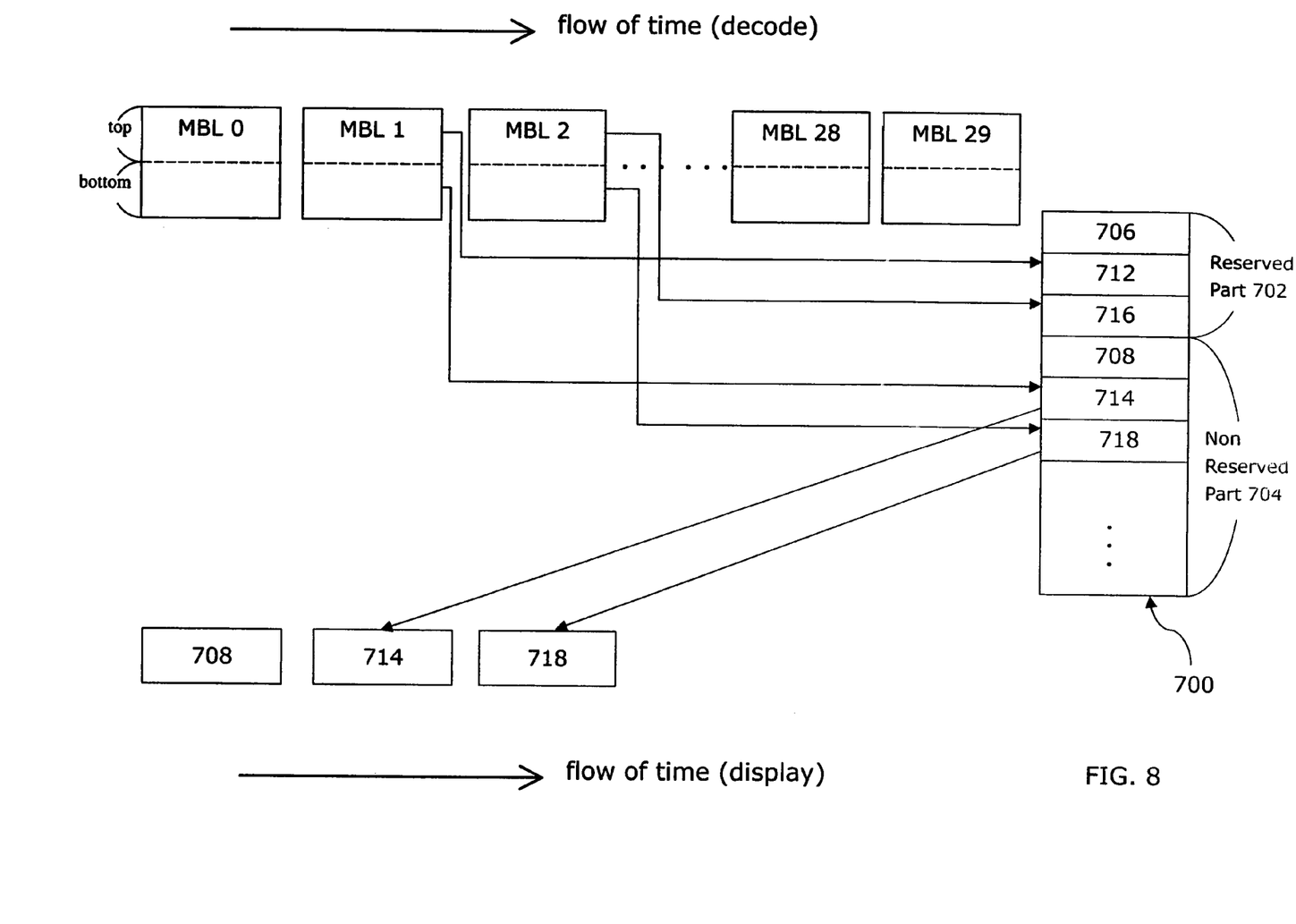

With reference to FIG. 8, the second and third MBLs (MBL 1 and MBL 2) are decoded, stored, and displayed in the same manner as MBL 0 such that a top sub-MBL 712 of MBL 1 and a top sub-MBL 716 of MBL 2 are stored in reserved part 702 of frame buffer 700 and a bottom sub-MBL 714 of MBL 1 and a bottom sub-MBL 718 of MBL 2 are stored in non-reserved part 704 of frame buffer 700. Since the bottom field of the first B-frame is displayed first, only decoded bottom sub-MBL 714 of MBL 1 and bottom sub-MBL 718 of MBL 2 are displayed while decoded top sub-MBL 712 of MBL 1 and top sub-MBL 718 of MBL 2 are stored in reserved part 702 of frame buffer 700 without being displayed, as shown in FIG. 8.

Figure 9:
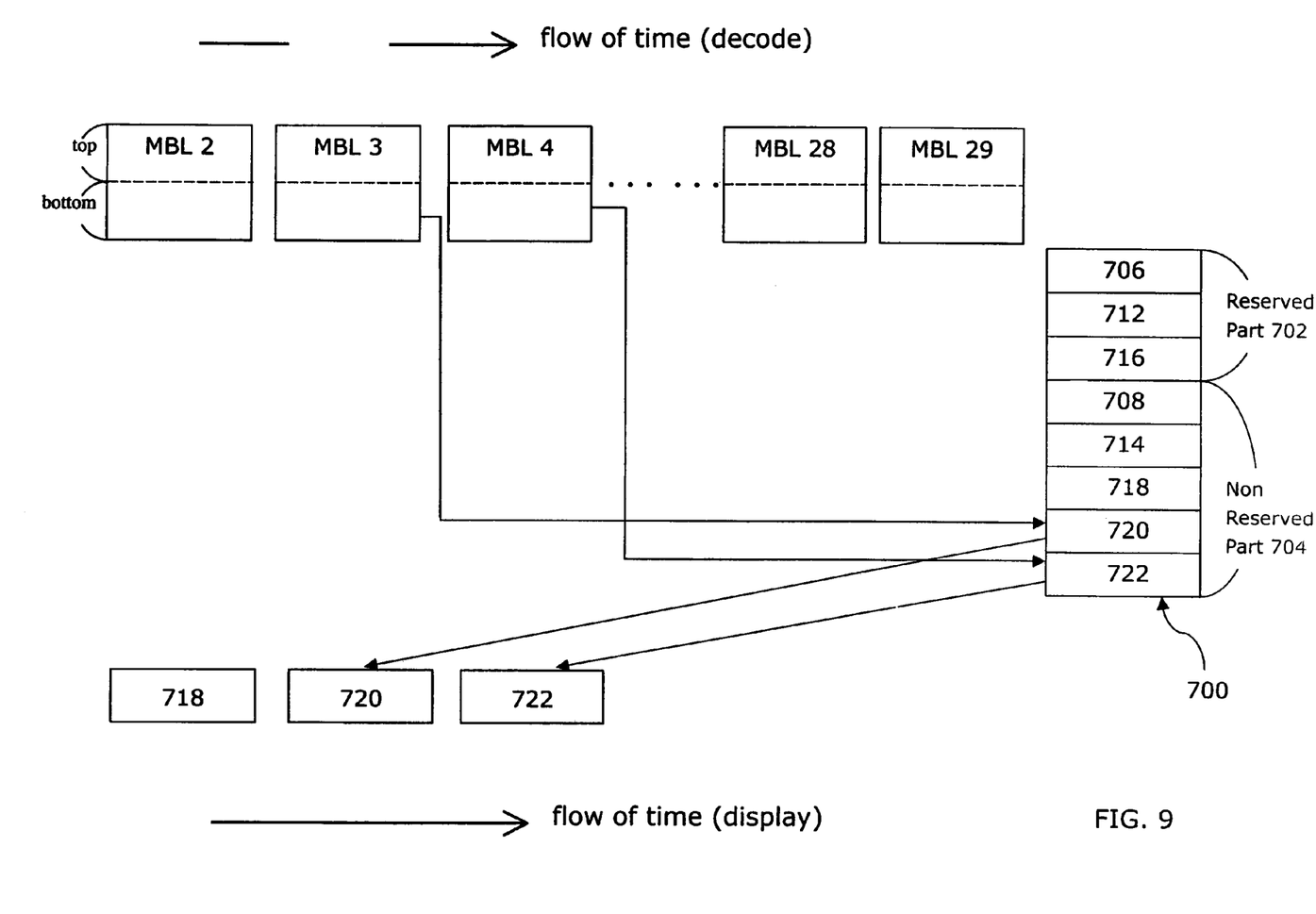

With reference to FIG. 9, for the following MBLs (MBL 3, MBL 4, ..., MBL 29), only bottom fields of the following MBLs are decoded and stored in non-reserved part 704 of frame buffer 700 in the field-based order and are displayed immediately after being decoded and stored. For example, with the reference to FIG. 9, a bottom sub-MBL 720 of MBL 3 and a bottom sub-MBL 722 of MBL 4, which are both non-reserved MBLs, are stored in non-reserved part 704 of frame buffer 700 after being decoded. The previously decoded non-reserved sub-MBL stored in non-reserved part 704 of frame buffer 700 will be replaced by the later decoded non-reserved sub-MBL due to limited memory size. Each bottom sub-MBL of MBL 3~MBL 29 is displayed in the field-based order immediately after being decoded and stored. The decoded reserved sub-MBLs 706, 712, and 716 are retained in reserved part 702 of frame buffer 700 after all bottom sub-MBLs of the first B-frame are displayed.

Figure 10:
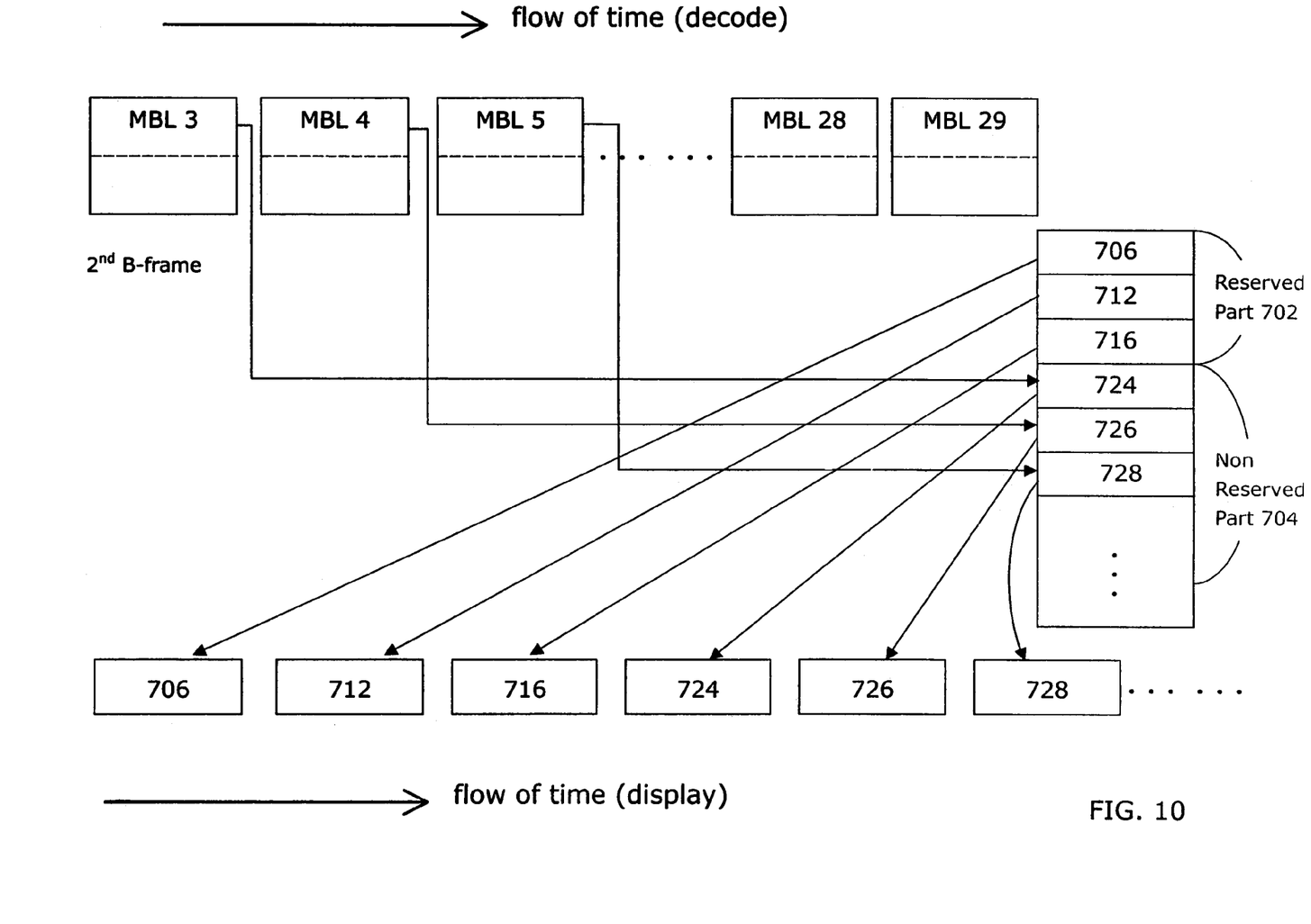

With reference to FIG. 10, after all bottom sub-MBLs of the first B-frame are decoded and displayed, the first three MBLs (MBL 0~MBL 2) need not be decoded again when decoding the top field of the first B-frame, top sub-MBL 706 of MBL 0, top sub-MBL 712 of MBL 1, and top sub-MBL 716 of MBL 2 are retrieved from reserved part 702 of frame buffer 700 to display. In this manner, only top sub-MBL of the other MBLs, such as a top sub-MBL 724 of MBL 3, a top sub-MBL 726 of MBL 4, and a top sub-MBL 728 of MBL 5, as shown in FIG. 10, need to be decoded since top sub-MBL of the first three MBLs, i.e., top sub-MBL 706 of MBL 0, top sub-MBL 712 of MBL 1, top sub-MBL 716 of MBL 2 are reserved sub-MBLs and are decoded and stored in reserved part 702 of frame buffer 700 in advance. The time and effort to decode the first B-frame can thus be saved.

Still referring to FIG. 10, the previously decoded non-reserved sub-MBL stored in non-reserved part 704 of frame buffer 700, such as sub-MBLs 708, 714, and 718 of FIG. 9, will be replaced by the later decoded non-reserved sub-MBL, such as sub-MBLs 724, 726, and 728 of FIG. 10, due to limited memory size. Since the previously decoded non-reserved sub-MBL stored in non-reserved part 704 of frame buffer 700 will be replaced by the later decoded non-reserved sub-MBL when decoding the first B-frame, the required size of frame buffer 700 can be reduced.

Figure 11:
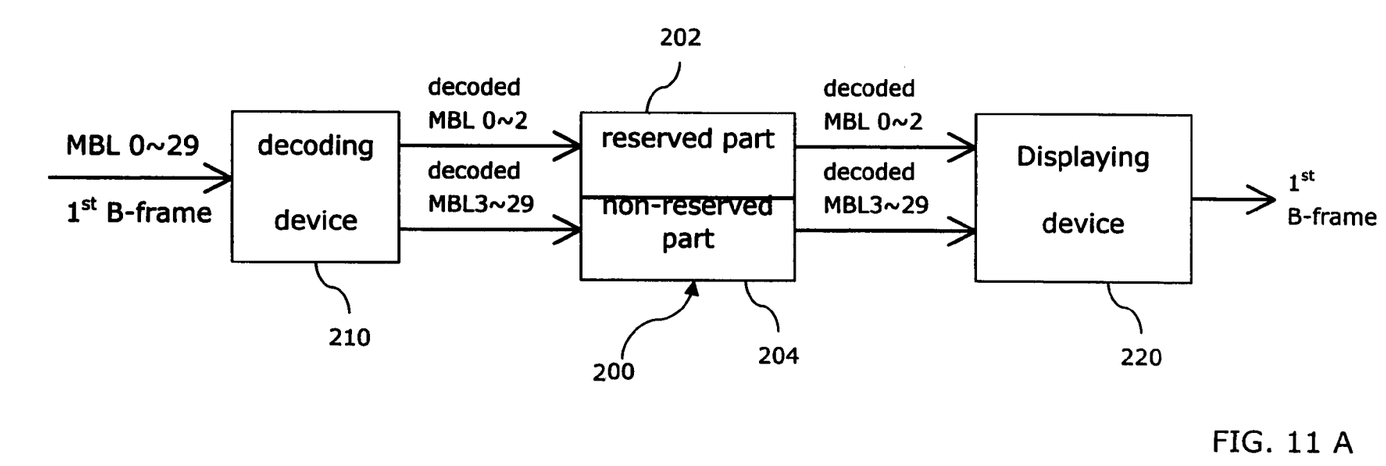
FIGS. 11A and 11B are diagrams illustrating an apparatus for decoding video image data, on which the method for decoding video image data of the first embodiment of the present invention can be practiced.

FIGS. 11A and 11B each illustrates an apparatus 1100 for decoding video image data, on which the method for decoding video image data of the first embodiment of the present invention can be practiced. Video image data decoding apparatus 1100 comprises a decoding device 1102 for decoding MBLs of each frame, a frame buffer 1104 for storing the decoded MBLs, and a displaying device 1106 for displaying the decoded MBLs in order. Frame buffer 1104 further includes a reserved part 1108 for storing reserved MBLs and a non-reserved part 1110 for storing non-reserved MBLs.

In FIGS. 11A and 11B, frame buffer 1104 including reserved part 1108 and non-reserved part 1110 generally corresponds to frame buffer 200 and its reserved part 202 and non-reserved part 204 described above with reference to the method shown in FIGS. 2~6. For convenience of description, FIGS. 11A and 11B also generally illustrate the flow of MBLs associated with the above-described method of the first embodiment.

With reference to FIG. 11A, when decoding the first B-frame, decoding device 1102 decodes MBL 0~29 of the first B-frame in order. After being decoded, MBL 0~MBL 2, which are the reserved MBLs, are stored in reserved part 1108 of frame buffer 1104 and the remaining MBLs (MBL 3~29) of the first B-frame, which are the non-reserved MBLs, are stored in non-reserved part 1110 of frame buffer 1104. The displaying device 1106 displays each of the decoded MBLs immediately after it is decoded and stored into frame buffer 1104. The reserved MBLs are retained in reserved part 1108 of frame buffer 1104 even after being displayed. The non-reserved MBLs are stored in non-reserved part 1110 of frame buffer 1104 after being decoded but need not be retained in frame buffer 1104 after being displayed. Each non-reserved MBL stored in frame buffer 200 can be replaced by another non-reserved MBL after it is displayed.

With reference to FIG. 11B, when decoding the second B-frame, decoding device 1102 only decodes the non-reserved MBLs of the second B-frame. The first three MBLs of the second B-frame, which are reserved MBLs, are not decoded by decoding device 1102. The decoded MBL 3~29 of the second B-frame, which are non-reserved MBLs, are stored in non-reserved part 1110 of frame buffer 1104 after being decoded. The reserved MBLs (MBL 0~2) of the first B-frame and the non-reserved MBLs (MBL 3~29) of the second B-frame are retrieved from frame buffer 1104 and displayed by displaying device 1106 in order. In this manner, the first three MBLs of the second B-frame need not be decoded nor stored. The time and effort to decode and store the reserved MBLs of the second B-frame can thus be saved.

Figure 12:
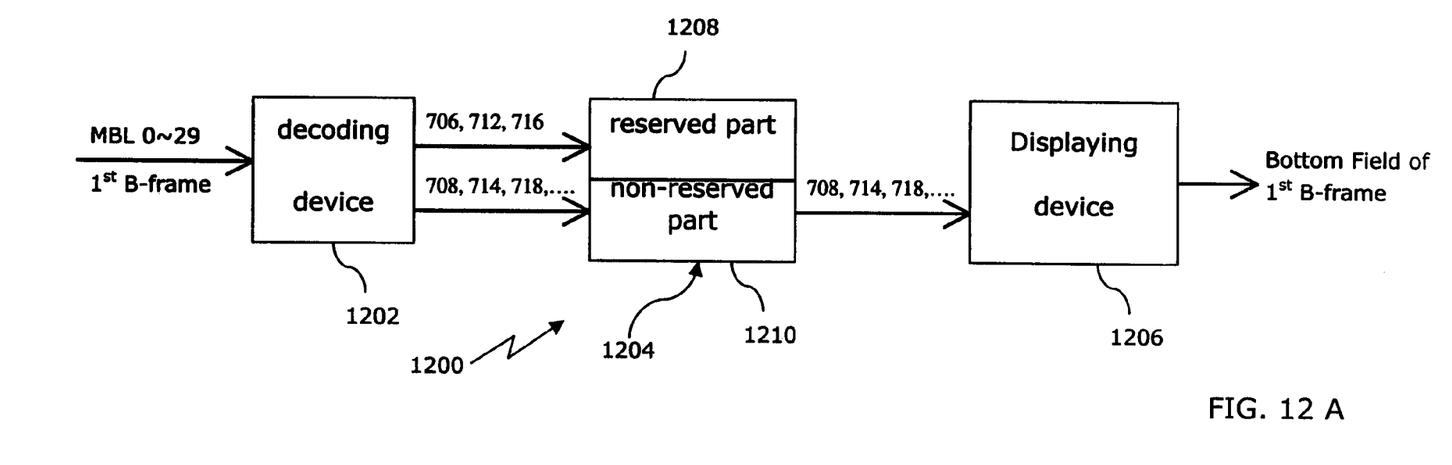
FIGS. 12A and 12B are diagrams illustrating an apparatus for decoding video image data, on which practices the method for decoding video image data of the second embodiment of the present invention can be practiced.

FIGS. 12A and 12B illustrate an apparatus 1200 for decoding video image data, on which the method for decoding video image data of the second embodiment of the present invention can be practiced. Video image data decoding apparatus 1200 shown in FIGS. 12A and 12B is an MPEG video decoder that decodes, stores, and displays the interlaced video image data in a field-based manner. Video image data decoding apparatus 1200 comprises a decoding device 1202 for decoding sub-MBLs of each frame, a frame buffer 1204 for storing the decoded sub-MBLs, and a displaying device 1206 for displaying the decoded sub-MBLs in the field-based order. Frame buffer 1204 further includes a reserved-part 1208 for storing reserved sub-MBLs and a non-reserved part 1210 for storing non-reserved sub-MBLs.

In FIGS. 12A and 12B, frame buffer 1204 including reserved part 1208 and non-reserved part 1210 generally corresponds to frame buffer 700 and its reserved part 702 and non-reserved part 704 described above with reference to the method shown in FIGS. 7~10. For convenience of description, FIGS. 12A and 12B also generally illustrate the flow of MBLs associated with the above-described method of the first embodiment.

With reference to FIG. 12A, when decoding the first B-frame, decoding device 1202 decodes top sub-MBL 706 of MBL 0, top sub-MBL 712 of MBL 1, and top sub-MBL 716 of MBL 2, which are the reserved sub-MBLs and are stored in reserved part 1208 of frame buffer 1204, as well as bottom sub-MBL 708 of MBL 0, bottom sub-MBL 714 of MBL 1, bottom sub-MBL 718 of MBL 2, which are the non-reserved sub-MBLs and are stored in non-reserved part 1210 of frame buffer 1204. Then, decoding device 1202 decodes bottom sub-MBLs of MBL 3~MBL 29 and stored these decoded bottom sub-MBLs into non-reserved part 1210 of frame buffer 1204. The displaying device 1206 displays only the decoded bottom sub-MBLs, which all are non-reserved sub-MBLs, immediately after they are decoded and stored into frame buffer 1204. The reserved sub-MBLs are retained in reserved part 1208 of frame buffer 1204 without being displayed. The non-reserved sub-MBLs are stored in non-reserved part 1210 of frame buffer 1204 after being decoded but need not be retained in frame buffer 1204 after being displayed. Each non-reserved sub-MBL stored in non-reserved part 1210 of frame buffer 1204 can be replaced by another non-reserved sub-MBL after it is displayed due to limited memory capacity.

With reference to FIG. 12B, after all bottom sub-MBLs of the first B-frame are decoded and displayed, the first three MBLs (MBL 0~MBL 2) need not be decoded again when decoding the top field of the first B-frame, top sub-MBL 706 of MBL 0, top sub-MBL 712 of MBL 1, and top sub-MBL 716 of MBL 2 are retrieved from reserved part 1208 of frame buffer 1204 to display. In this manner, only top sub-MBL of the other MBLs, such as a top sub-MBL 724 of MBL 3, a top sub-MBL 726 of MBL 4, and a top sub-MBL 728 of MBL 5, as shown in FIG. 10, need to be decoded since top sub-MBL of the first three MBLs, i.e., top sub-MBL 706 of MBL 0, top sub-MBL 712 of MBL 1, top sub-MBL 716 of MBL 2 are reserved sub-MBLs and are decoded and stored in reserved part 702 of frame buffer 700 in advance. The time and effort to decode the first B-frame can thus be saved.

Displaying device 1206 displays all sub-MBLs in the field-based order so that all bottom sub-MBLs of the first frame, which are all the non-reserved sub-MBLs and stored in non-reserved part 1210 of frame buffer 1204 after being decoded, are displayed first. Then, top sub-MBL 706 of MBL 0, top sub-MBL 712 of MBL 1, and top sub-MBL 716 of MBL 2, which are all reserved sub-MBLs and are stored in the reserved part 1208 of frame buffer 1204 after being decoded, are displayed. Afterward top sub-MBLs of MBL 3~MBL 29, which are also the non-reserved reserved sub-MBLs and are stored in the reserved part 1208 of frame buffer 1204 after being decoded, are displayed. Since the previously decoded non-reserved sub-MBL stored in non-reserved part 1210 of frame buffer 1204 will be replaced by the later decoded non-reserved sub-MBL of the second B-frame, the required size of frame buffer 1204 can be reduced.

The embodiments disclosed above are for use by a video decoder compatible with the NTSC standard. However, the invention is not so limited. Methods consistent with embodiments of the present invention can be practiced to decode video image data compatible with the PAL standard, or other standards.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A method for decoding a frame of video image data in a video display apparatus, comprising:
dividing the frame, by a decoding device of the video display apparatus, into a reserved portion and a non-reserved portion;
decoding, by the decoding device, the reserved portion of the frame;
storing the reserved portion of the frame into a first portion of a frame buffer;
displaying the reserved portion of the frame on a display device of the video display apparatus;
decoding, by the decoding device, a first part of the non-reserved portion of the frame;
storing the first cart of the non-reserved portion of the frame in a second portion of the frame buffer;

displaying the first part of the non-reserved portion of the frame on the display device;

decoding, by the decoding device, a second part of the non-reserved portion of the frame;

storing the second part of the non-reserved portion of the frame in the second portion of the frame buffer; and displaying the second part of the non-reserved portion of the frame on the display device.

2. The method of claim 1, wherein the video image data is interlaced video image data and the frame comprises a top field and a bottom field as sub-frames.

3. The method of claim 2, wherein the frame further includes a plurality of macroblock lines, the macroblock lines include a plurality of macroblocks, and each of the macroblocks is divided into a top sub-macroblock belonging to the top field and a bottom sub-macroblock belonging to the bottom field.

4. The method of claim 1, wherein at least one macroblock in the macroblock lines belongs to the reserved portion of the frame.

5. The method of claim 1, wherein the video image data is decoded according to the Motion Pictures Expert Group (MPEG) standard.

6. The method of claim 5, wherein the frame is a bi-directionally predictive (B) frame.

7. The method of claim 1, wherein the format of the video image data is compatible with the NTSC (National Television Standard Committee) standard.

8. The method of claim 1, wherein the format of the video image data is compatible with the PAL (Phase Alternating Line) standard.

9. An apparatus for decoding a frame of video image data comprising:

a frame buffer;

a decoding device configured to
  divide the frame into a reserved portion and a non-reserved portion;
  decode the reserved portion of the frame;
  store the reserved portion of the frame into a first portion of the frame buffer;
  decode a first part of the non-reserved portion of the frame;
  store the first part of the non-reserved portion of the frame in a second portion of the frame buffer;
  decode a second part of the non-reserved portion of the frame; and
  store the second part of the non-reserved portion of the frame in the second portion of the frame buffer; and a display device configured to display the reserved portion of the frame, the first part of the non-reserved portion of the frame, and the second part of the non-reserved portion of the frame.

10. The apparatus of claim 9, wherein the frame buffer is coupled to the decoding device to store the decoded reserved portion of the frame.

11. The method of claim 9, wherein the video image data is interlaced video image data and the frame comprises a top field and a bottom field.

12. The method of claim 11, wherein the frame further includes a plurality of macroblock lines, the macroblock lines include a plurality of macroblocks, and each of the macroblocks is divided into a top sub-macroblock belonging to the top field and a bottom sub-macroblock belonging to the bottom field.

13. The method of claim 12, wherein at least one macroblock in the macroblock lines belongs to the reserved portion of the frame.

14. The apparatus of claim 9, wherein the video image data is decoded according to the Motion Pictures Expert Group (MPEG) standard.

15. The apparatus of claim 14, wherein the frame is a bi-directionally predictive (B) frame data.

16. The apparatus of claim 9, wherein the format of the video image data is compatible with the NTSC (National Television Standard Committee) standard.

17. The apparatus of claim 9, wherein the format of the video image data is compatible with the PAL (Phase Alternating Line) standard.

* * * * *

UNITED STATES PATENT AND TRADEMARK OFFICE
CERTIFICATE OF CORRECTION

PATENT NO. : 7,688,896 B2  Page 1 of 1
APPLICATION NO. : 11/045097
DATED : March 30, 2010
INVENTOR(S) : Ying-Chih Yang, Han-Liang Chou and Jen-Yi Liao It is certified that error appears in the above-identified patent and that said Letters Patent is hereby corrected as shown below:

On the Title Page, Item (74), in the "*Attorney, Agent, or Firm*", line 2,
"Garrett, Dunner, LLP" should read --Garrett & Dunner, LLP--.

In claim 1, column 8, line 66, "cart" should read --part--.

In claim 9, column 9, lines 32-33, "data comprising:" should read
--data, comprising:--.

Signed and Sealed this

Fifteenth Day of June, 2010

David J. Kappos
*Director of the United States Patent and Trademark Office*